US010152678B2

(12) United States Patent
Pandev et al.

(10) Patent No.: US 10,152,678 B2
(45) Date of Patent: Dec. 11, 2018

(54) SYSTEM, METHOD AND COMPUTER PROGRAM PRODUCT FOR COMBINING RAW DATA FROM MULTIPLE METROLOGY TOOLS

(71) Applicant: KLA-Tencor Corporation, Milpitas, CA (US)

(72) Inventors: Stilian Ivanov Pandev, Santa Clara, CA (US); Thaddeus Gerard Dziura, San Jose, CA (US); Andrei V. Shchegrov, Los Gatos, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 248 days.

(21) Appl. No.: 14/942,738

(22) Filed: Nov. 16, 2015

(65) Prior Publication Data
US 2016/0141193 A1     May 19, 2016

Related U.S. Application Data

(60) Provisional application No. 62/082,097, filed on Nov. 19, 2014.

(51) Int. Cl.
*G06N 99/00*     (2010.01)
(52) U.S. Cl.
CPC ................... *G06N 99/005* (2013.01)
(58) Field of Classification Search
CPC .................................................. G06N 99/005
USPC .......................................................... 702/81
See application file for complete search history.

(56) References Cited

U.S. PATENT DOCUMENTS

| | | | |
|---|---|---|---|
| 5,608,526 A | 3/1997 | Piwonka-Corle et al. | |
| 5,859,424 A | 1/1999 | Norton et al. | |
| 6,429,943 B1 | 8/2002 | Opsal et al. | |
| 7,478,019 B2 | 1/2009 | Zangooie et al. | |
| 7,933,026 B2 | 4/2011 | Opsal et al. | |
| 2007/0268498 A1 | 11/2007 | Stanke et al. | |
| 2012/0226644 A1* | 9/2012 | Jin ...................... | G06N 3/0454 706/19 |

(Continued)

OTHER PUBLICATIONS

International Search Report from International Application No. PCT/US2015/061425, dated Feb. 23, 2016.
(Continued)

*Primary Examiner* — Ricky Ngon
(74) *Attorney, Agent, or Firm* — Zilka-Kotab, P.C.

(57) ABSTRACT

A system, method and computer program product are provided for combining raw data from multiple metrology tools. Reference values are obtained for at least one parameter of a training component. Signals are collected for the at least one parameter of the training component, utilizing a first metrology tool and a different second metrology tool. Further, at least a portion the signals are transformed into a set of signals, and for each of the at least one parameter of the training component, a corresponding relationship between the set of signals and the reference values is determined and a corresponding training model is created therefrom. Signals from a target component are collected utilizing at least the first metrology tool and the second metrology tool, and each created training model is applied to the signals collected from the target component to measure parametric values for the target component.

21 Claims, 4 Drawing Sheets

(56) References Cited

U.S. PATENT DOCUMENTS

| | | | |
|---|---|---|---|
| 2013/0148130 A1* | 6/2013 | Li | G01B 11/24 |
| | | | 356/601 |
| 2013/0245985 A1 | 9/2013 | Flock et al. | |
| 2013/0292567 A1 | 11/2013 | Foucher et al. | |
| 2014/0019097 A1 | 1/2014 | Bakeman et al. | |
| 2014/0111791 A1 | 4/2014 | Manassen et al. | |
| 2014/0172394 A1 | 6/2014 | Kuznetsov et al. | |
| 2014/0222380 A1 | 8/2014 | Kuznetsov et al. | |
| 2014/0273299 A1 | 9/2014 | Vaid et al. | |
| 2014/0297211 A1 | 10/2014 | Pandev et al. | |
| 2014/0316730 A1 | 10/2014 | Shchegrov et al. | |
| 2015/0032398 A1 | 1/2015 | Peterlinz et al. | |
| 2015/0046118 A1 | 2/2015 | Pandev et al. | |
| 2015/0332167 A1* | 11/2015 | Kaushal | G06N 99/005 |
| | | | 706/12 |
| 2016/0313651 A1* | 10/2016 | Middlebrooks | G03F 7/705 |

OTHER PUBLICATIONS

Vaid, A. et al., "Hybrid metrology for advanced semiconductor fabrication," SPIE Newsroom, Aug. 17, 2011, pp. 1-3.
U.S. Appl. No. 14/294,540, filed Jun. 3, 2014.
Vaid, A. et al., "A Holistic Metrology Approach: Hybrid Metrology Utilizing Scatterometry,CD-AFM and CD-SEM," Proc. of SPIE vol. 7971, 797103, 2011, pp. 797103-1-797103-20.
Vaid, A. et al., "Hybrid metrology solution for 1X node technology," Proc. of SPIE vol. 8324, 832404, 2012, pp. 832404-1-832404-22.
Vaid, A. et al., "Hybrid metrology universal engine: co-optimization," Proc. of SPIE vol. 9050, 905009, 2014, pp. 905009-1-905009-13.
Hazart, J., "Data Fusion for CD Metrology: Heterogeneous Hybridization of Scatterometry, CDSEM and AFM data," Proc. of SPIE vol. 9050, 90502L, 2014, pp. 90502L-1-90502L-14.

* cited by examiner

SYSTEM, METHOD AND COMPUTER PROGRAM PRODUCT FOR COMBINING RAW DATA FROM MULTIPLE METROLOGY TOOLS

RELATED APPLICATION(S)

This application claims the benefit of U.S. Provisional Patent Application No. 62/082,097 filed Nov. 19, 2014, the entire contents of which are incorporated herein by reference.

FIELD OF THE INVENTION

The present invention relates to metrology tools. and more particularly to hybrid metrology tools.

BACKGROUND

Metrology generally involves measuring various physical features of a target component. For example, structural and material characteristics (e.g. material composition, dimensional characteristics of structures and/or critical dimensions of structures, etc.) of the target component can be measured using metrology tools. In the example of semiconductor metrology, various physical features of a fabricated semiconductor component may be measured using a metrology tool.

Once a metrology measurement is obtained, the measurement may be analyzed. This analysis typically involves a library having predefined value(s) for parameters specific to the target component (i.e. a parametric model of the target component). In particular, the library may include value ranges for floating parameters. The library may then be used to provide a fast mathematical approximation that can quickly reproduce the solution of a system having the target component with a reasonable accuracy, given the set of values for the parametric model.

In some circumstances, it is desirable to use multiple different metrology tools to measure a target component. This technique is generally known as "hybrid metrology." However, this requires datasets from the disparate metrology tools to be combined in some fashion to achieve a composite measurement result.

There may be many reasons to employ the multiple different metrology tools, such as insufficient measurement performance of individual metrology tools. The expectation then is that two or more metrology tools using different measurement techniques can be combined, with each technique used according to its particular strengths, to produce a total measurement that meets specifications for stability and process tracking, on all the critical dimensional and composition parameters for the target component. One example of an existing hybrid metrology tool is described in A. Vaid et al., "A Holistic Metrology Approach: Hybrid Metrology Utilizing Scatterometry, CD-AFM, and CD-SEM", SPIE Proc. Vol. 7971 (2011).

Unfortunately, known hybrid metrology tools exhibit various limitations. For example, critical to the success of hybrid metrology is the exact method by Which measurement results from each tool are combined. Since neither does any metrology tool measure with perfect accuracy and precision, nor are all metrology tools in perfect agreement, measurement errors can occur if these aspects of the measurements are not mitigated in some way. Because of this, the "injection" or simple feed forward technique, in which measurement results from Tool A are fed forward to the model for Tool B and fixed, is generally regarded as not robust.

An alternative technique, denoted here as "results data transform", can be used, whereby known offsets between metrology tools, as well as possibly correlation slope error, are corrected before passing data between tools. Higher order corrections of tool errors are also likely possible. An example of this technique is described in A. Vaid et al., "Hybrid metrology solution for IX node technology", SPIE Proc. Vol. 8324 (2012). In that work the concepts of 'data modification parameter' (DMP) (offset, matching, accuracy, . . . ) and 'DMP Strength' were introduced. DMP Strength is a scale factor that controls the degree to which data from Tool A is used by Tool B. The explicit way in Which DMP Strength was used was not described.

More recently a third method of hybrid metrology known as 'co-optimization' is being explored, in which models for the measurements performed on all tools to be combined are simultaneously regressed, with model parameters that are common to both (or all) metrology tools being constrained in some manner. Several recent applications of this technique to hybridization with Critical Dimension—Scanning Electron Microscopy (CD-SEM) measurements have been reported. In A. Vaid, "Hybrid metrology universal engine: co-optimization", SPIE Proc. 9050 (2014) the success of this hybrid approach relied on a previous calibration of the sidewall angle dependent CD value reported by the CD-SEM, and then a correction of the CD-SEM CD value using the optical CD (OCD) reported sidewall angle (SWA) value during the actual hybrid measurement. Another example of this is described in J. Hazart et al., "Data Fusion for CD Metrology: Heterogeneous Hybridization of Scatterometry, CDSEM, and AFM data", SPIE Proc. Vol. 9050 (2014), in which OCD data were combined with a compact model of CD-SEM image data.

While recent trends indicate a move towards co-optimization methods, other techniques may be preferable as co-optimization requires an intimate working knowledge, on the part of the hybrid solution supplier, of measurement algorithms and calibration methods across very different metrology tools, which may be manufactured by competing suppliers.

There is thus a need for addressing these and/or other issues associated with the prior art implementations of inspection systems.

SUMMARY

A system, method and computer program product are provided for combining raw data from multiple metrology tools. In use, a training component is identified, and reference values are obtained for at least one parameter of the training component. A first set of signals are collected for the at least one parameter of the training component, utilizing a first metrology tool, and a second set of signals are collected for the at least one parameter of the training component, utilizing a second metrology tool that is different from the first metrology tool. Further, at least a portion of each of: the first set of signals and the second set of signals are transformed into a third set of signals, and for each of the at least one parameter of the training component, a corresponding relationship between the third set of signals and the reference values is determined and a corresponding training model is created therefrom. Signals from a target component are collected utilizing at least the first metrology tool and the second metrology tool, and each created training model is applied to the signals collected from the target component to measure parametric values for the target component.

DETAILED DESCRIPTION

In the field of semiconductor metrology, a metrology tool may comprise an illumination system which illuminates a target, a collection system which captures relevant information provided by the illumination system's interaction (or lack thereof) with a target, device or feature, and a processing system which analyzes the information collected using one or more algorithms. Metrology tools can be used to measure structural and material characteristics (e.g. material composition, dimensional characteristics of structures and films such as film thickness and/or critical dimensions of structures, overlay, etc.) associated with various semiconductor fabrication processes. These measurements are used to facilitate process controls and/or yield efficiencies in the manufacture of semiconductor dies.

The metrology tool can comprise one or more hardware configurations which may be used in conjunction with certain embodiments of this invention to, e.g., measure the various aforementioned semiconductor structural and material characteristics. Examples of such hardware configurations include, but are not limited to, the following.

Spectroscopic ellipsometer (SE)
SE with multiple angles of illumination
SE measuring Mueller matrix elements (e.g. using rotating compensator(s))
Single-wavelength ellipsometers
Beam profile ellipsometer (angle-resolved ellipsometer)
Beam profile reflectometer (angle-resolved reflectometer)
Broadband reflective spectrometer (spectroscopic reflectometer)
Single-wavelength reflectometer
Angle-resolved reflectometer
Imaging system
Scatterometer (e.g. speckle analyzer)

Figure 1:
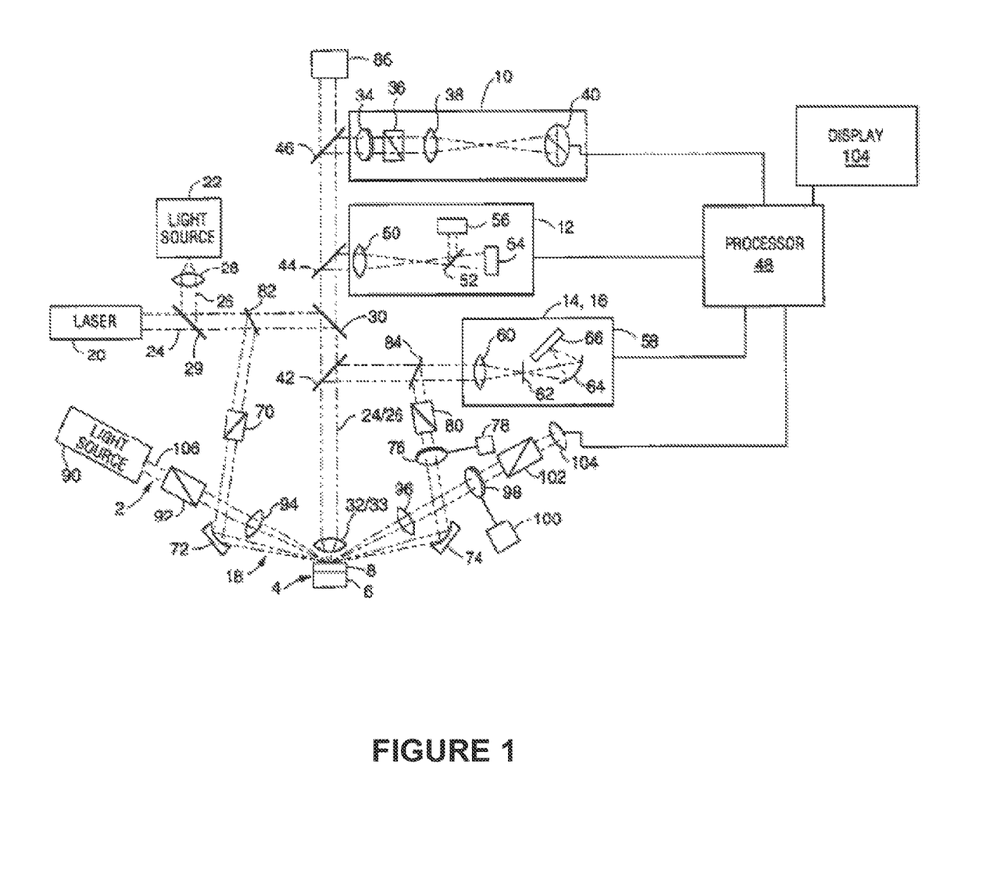
FIG. 1 shows a schematic of an exemplary metrology tool, in accordance with the prior art.

The hardware configurations can be separated into discrete operational systems. On the other hand, one or more hardware configurations can be combined into a single tool. One example of such a combination of multiple hardware configurations into a single tool is shown in FIG. 1, incorporated herein from U.S. Pat. No. 7,933,026 which is hereby incorporated by reference in its entirety for all purposes. FIG. 1 shows, for example, a schematic of an exemplary metrology tool that comprises: a) a broadband SE (i.e., 18); b) a SE (i.e., 2) with rotating compensator (i.e., 98); c) a beam profile ellipsometer (i.e., 10); d) a beam profile reflectometer (i.e., 12); e) a broadband reflective spectrometer (i.e., 14); and f) a deep ultra-violet reflective spectrometer (i.e., 16). In addition, there are typically numerous optical elements in such systems, including certain lenses, collimators, mirrors, quarter-wave plates, polarizers, detectors, cameras, apertures, and/or light sources. The wavelengths for optical systems can vary from about 120 nm to 3 microns. For non-ellipsometer systems, signals collected can be polarization-resolved or unpolarized. FIG. 1 provides an illustration of multiple metrology heads integrated on the same tool. However, in many cases, multiple metrology tools are used for measurements on a single or multiple metrology targets. This is described, for example, in U.S. Pat. No. 7,478,019. "Multiple tool and structure analysis," which is also hereby incorporated by reference in its entirety for all purposes.

The illumination system of the certain hardware configurations includes one or more light sources. The light source may generate light having only one wavelength (i.e., monochromatic light), light having a number of discrete wavelengths (i.e., polychromatic light), light having multiple wavelengths (i.e., broadband light) and/or light the sweeps through wavelengths, either continuously or hopping between wavelengths (i.e. tunable sources or swept source). Examples of suitable light sources are: a white light source, an ultraviolet (UV) laser, an arc lamp or an electrode-less lamp, a laser sustained plasma (LSP) source, for example those commercially available from Energetiq Technology, Inc., Woburn, Mass., a super-continuum source (such as a broadband laser source) such as those commercially available from NKT Photonics Inc., Morganville, N.J., or shorter-wavelength sources such as x-ray sources, extreme UV sources, or some combination thereof. The light source may also be configured to provide light having sufficient brightness, which in some cases may be a brightness greater than about 1 W/(nm $cm^2$ Sr). The metrology system may also include a fast feedback to the light source for stabilizing its power and wavelength. Output of the light source can be delivered via free-space propagation, or in some cases delivered via optical fiber or light guide of any type.

The metrology tool is designed to make many different types of measurements related to semiconductor manufacturing. Certain embodiments may be applicable to such measurements. For example, in certain embodiments the tool may measure characteristics of one or more targets, such as critical dimensions, overlay, sidewall angles, film thicknesses, process-related parameters focus and/or dose). The targets can include certain regions of interest that are periodic in nature, such as for example gratings in a memory die. Targets can include multiple layers (or films) whose thicknesses can be measured by the metrology tool. Targets can include target designs placed (or already existing) on the semiconductor wafer for use, e.g., with alignment and/or overlay registration operations. Certain targets can be located at various places on the semiconductor wafer. For example, targets can be located within the scribe lines (e.g., between dies)and/or located in the die itself. In certain embodiments, multiple targets are measured (at the same time or at differing times) by the same or multiple metrology tools as described in U.S. Pat. No. 7,478,019. The data from such measurements may be combined. Data from the metrology tool is used in the semiconductor manufacturing process for example to feed-forward, feed-backward and/or feed-sideways corrections to the process e.g. lithography, etch) and therefore, might yield a complete process control solution.

As semiconductor device pattern dimensions continue to shrink, smaller metrology targets are often required. Furthermore, the measurement accuracy and matching to actual device characteristics increase the need for device-like targets as well as in-die and even on-device measurements. Various metrology implementations have been proposed to achieve that goal. For example, focused beam ellipsometry based on primarily reflective optics is one of them and described in the patent by Piwonka-Corle et al. (U.S. Pat. No. 5,608,526, "Focused beam spectroscopic ellipsometry method and system"). Apodizers can be used to mitigate the effects of optical diffraction causing the spread of the illumination spot beyond the size defined by geometric optics. The use of apodizers is described in the patent by Norton, U.S. Pat. No. 5,859,424, "Apodizing filter system useful for reducing spot size in optical measurements and other applications". The use of high-numerical-aperture tools with simultaneous multiple angle-of-incidence illumination is another way to achieve small-target capability. This technique is described, e.g. in the patent by Opsal et al, U.S. Pat. No. 6,429,943, "Critical dimension analysis with simultaneous multiple angle of incidence measurements".

Other measurement examples may include measuring the composition of one or more layers of the semiconductor stack, measuring certain defects on (or within) the wafer, and measuring the amount of photolithographic radiation exposed to the wafer. In some cases, metrology tool and algorithm may be configured for measuring non-periodic targets, see e.g. "The Finite Element Method for Full Wave Electromagnetic Simulations in CD Metrology Using Scatterometry" by P. Jiang et al (pending U.S. patent application Ser. No. 14/294,540, filed Jun. 3, 2014, attorney docket no. P0463) or "Method of electromagnetic modeling of finite structures and finite illumination for metrology and inspection" by A. Kuznetsov et al. (pending U.S. patent application Ser. No. 14/170,150, attorney docket no. P0482).

Measurement of parameters of interest usually involves a number of algorithms. For example, optical interaction of the incident beam with the sample is modeled using EM (electro-magnetic) solver and uses such algorithms as RCWA, FEM, method of moments, surface integral method, volume integral method, FDTD, and others. The target of interest is usually modeled (parameterized) using a geometric engine, or in some cases, process modeling engine or a combination of both. The use of process modeling is described in "Method for integrated use of model-based metrology and a process model," by A. Kuznetsov et al. (pending U.S. patent application Ser. No. 14/107,850, attorney docket no. P4025). A geometric engine is implemented, for example, in AcuShape software product of KLA-Tencor.

Collected data can be analyzed by a number of data fitting and optimization techniques an technologies including libraries, Fast-reduced-order models; regression; machine-learning algorithms such as neural networks, support-vector machines (SVM); ditnensionality-reduction algorithms such as, e.g., PCA (principal component analysis), ICA (independent component analysis), LLE (local-linear embedding); sparse representation such as Fourier or wavelet transform; Kalman filter; algorithms to promote matching from same or different tool types, and others.

Collected data can also be analyzed by algorithms that do not include modeling, optimization and/or fitting e.g. U.S. patent application Ser. No. 14/057,827.

Computational algorithms are usually optimized for metrology applications with one or more approaches being used such as design and implementation of computational hardware, parallelization, distribution of computation, load-balancing, multi-service support, dynamic load optimization, etc. Different implementations of algorithms can be done in firmware, software, FPGA, programmable optics components, etc.

The data analysis and fitting steps usually pursue one or more of the following goals:

Measurement of CD, SWA, shape, stress, composition, films, band-gap, electrical properties, focus/dose, overlay, generating process parameters (e.g., resist state, partial pressure, temperature, focusing model), and/or any combination thereof;

Modeling and/or design of metrology systems;

Modeling, design, and/or optimization of metrology targets.

The following description discloses embodiments of a metrology system, method, and computer program product (embodied on a non-transitory computer readable medium) The following description discloses embodiments of a method, a system (having a processor for performing the method), and a computer program product (embodied on a non-transitory computer readable medium and having code adapted to be executed by a computer to perform the method) for combining raw data from multiple metrology tools.

The metrology tools may be any of those described above with reference to FIG. 1 or may be other types of metrology tools. The metrology tools may reside on a same hardware platform or different hardware platforms. When on the same hardware platform, a processor of a computer residing on the same or different hardware platform is in communication with the metrology tools to perform the methods described with respect to the subsequent figures below. When on different hardware platforms, the processor of the computer may reside on one of the hardware platforms having ones of the metrology tools or may reside on an entirely different platform, but again, is in communication with the metrology tools to perform the methods described with respect to the subsequent figures below.

Figure 2:
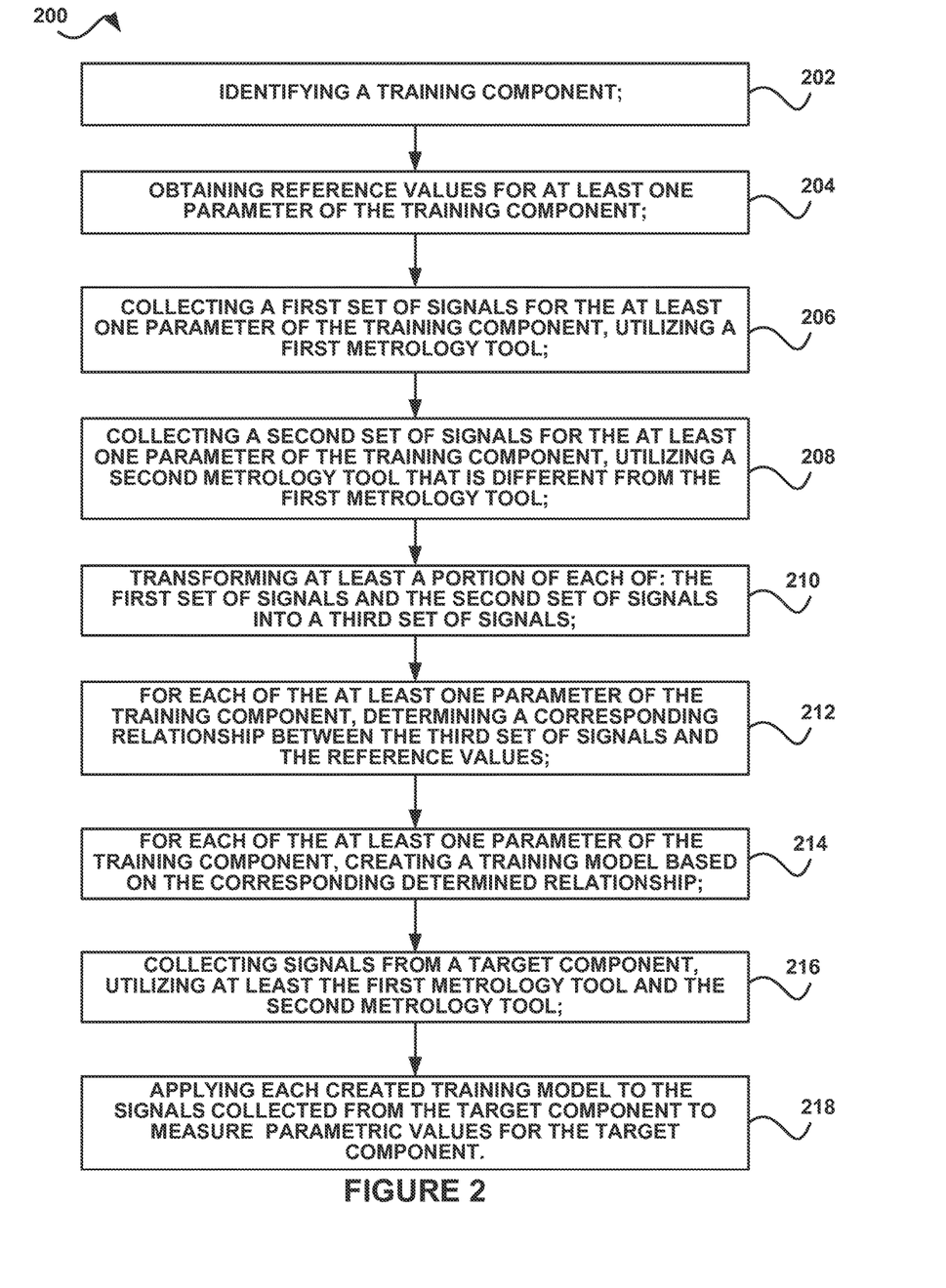
FIG. 2 illustrates a method for combining raw data from multiple metrology tools, in accordance with an embodiment.

FIG. 2 illustrates a method 200 for combining raw data from multiple metrology tools, in accordance with an embodiment. In operation 202, a training component is identified. In one embodiment, the training component may be a design on experiment (DOE) component (e.g. focus exposure matrix (FEM) wafer, etc.). The DOE component may be created particularly for training purposes to ultimately allow for a target component to be measured by multiple specific metrology tools where the raw data resulting therefrom is combined. Thus, the DOE component may be different from the target component.

In this embodiment, the DOE component may be generated for which the critical dimensional or composition characteristics of the component, or the process tool conditions, are systematically varied. For example, geometric parameters, material composition parameters, process parameters, overlay parameters, etc. may be varied for the DOE component, where the parameters may more specifically possibly include scanner focus and dose, material (such as SiGe) composition, dopant concentration, feature critical dimension, feature overlay, feature height, thickness, etch depth, etch tool gas flow rate, etch tool wafer temperature, etc. Moreover, the wafer may be patterned and/or unpatterned, depending on the specific application. While only one DOE component is described herein, it should be noted that a set of DOE components may also be identified, and method 200 similarly applied to each of the multiple DOE components in the set.

In another embodiment, the training component may not necessarily be generated specifically for combining raw data from multiple metrology tools, but may instead be the target component to ultimately be measured by the multiple metrology tools. When the training component is the target component, natural or programmed variations within the target component may be used with regard to the parameters mentioned below in operation 204.

Additionally, as shown in operation 204, reference values for at least one parameter of the training component are obtained. This parameter may be the geometric parameter (e.g. critical dimension, sidewall angle, profile height, etc.), material composition parameter, process parameter (e.g. focus parameter, dose parameter, etc.), overlay parameter, and/or any of the other parameters described above. Accordingly, the reference values may be measured values for each desired parameter of the training component.

In various embodiments, the reference values for the at least one parameter of the training component may be obtained utilizing critical dimension scanning electron microscopy (CD-SEM), transmission electron microscopy (TEM), and/or atomic force microscopy (AFM). With respect to the embodiment where the target component is identified in operation 202, and just by way of example, X-ray photoelectron spectroscopy (XPS) metrology can be used to measure Hf composition variations in a high-k process. Since XPS can be calibrated to provide absolute composition reference data, the data for optical SE and XPS may be co-processed using machine learning and data compression techniques (such neural network and principal component analysis (PCA)) and results from a single target component or multiple target components can be improved without involving a separate training step with the special DOE component otherwise being made.

Further, in operation 206, a first set of signals for the at least one parameter of the training component are collected, utilizing a first metrology tool. In particular, the first set of signals may be raw data collected by the first metrology tool for each desired parameter of the training component. Similarly, in operation 208, a second set of signals for the at least one parameter of the training component are collected, utilizing a second metrology tool that is different from the first metrology tool. Again, the second set of signals may be raw data collected by the second metrology tool for each desired parameter of the training component.

Table 1 illustrates various examples of raw data.

TABLE 1

(1) diffracted intensity vs. diffraction angle from a HRXRD tool
(2) fluorescent intensity vs. photon energy from a x-ray fluorescence (XRF) tool
(3) Raman scattering intensity vs. wavenumber from a Raman scattering tool
(4) x-ray photoelectron counts vs. binding energy for a x-ray photoelectron spectroscopy (XPS) tool
(5) ellipsometer or reflectometer signal vs. wavelength for a spectroscopic scatterometer (OCD) tool
(6) x-ray reflectance vs. angle of incidence for a x-ray reflectometer (XRR)
(7) reflectance vs. incidence angle for an angle-based scatterometry tool
(8) diffracted intensity vs. angle for a small angle x-ray scattering (SAXS) tool As noted above, the second metrology tool is different from the first metrology tool. In various embodiments, the first metrology tool and the second metrology tool may each be a different one of: Spectroscopic ellipsometer (SE); SE with multiple angles of illumination; SE measuring Mueller matrix elements; Single-wavelength ellipsometers; Beam profile ellipsometer; Beam profile reflectometer; Broadband reflective spectrometer; Single-wavelength reflectometer; Angle-resolved reflectometer; Imaging system; Scatterometer; Small-angle X-ray scattering (SAXS) device; X-ray powder diffraction (XRD) device; X-ray Fluorescence (XRF) device; X-ray photoelectron spectroscopy (XPS) device; X-ray reflectivity (XRR) device; Raman spectroscopy device; scanning electron microscopy (SEM) device; TEM device; and AFM device.

As shown in operation 210, at least a portion of each of: the first set of signals and the second set of signals are transformed into a third set of signals. In one embodiment, operation 210 may involve at least one preprocessing operation that is applied to the first set of signals and the second set of signals, or the portions thereof. Such preprocessing operation(s) may include alignment (e.g. image alignment), filtering (e.g. noise filtering), normalization, aberration corrections, and/or other technology specific operations.

In another embodiment, operation 210 may involve combining the first set of signals and the second set of signals, and then transforming the combined signals into the third set of signals (i.e. a unified dataset), optionally after ordering the individual first set of signals and second set of signal by training component condition. This combining may occur after the above mentioned preprocessing operation(s). For example, the columns of the preprocessed signals from different metrology tools may be concatenated, and then the resulting combined data set may be transformed to the third set of signals, optionally with a smaller number of parameters/columns. Principal component analysis (PCA) can be used for creating a model that transforms the combined data to the third set of signals (which are principal components in this case). In another embodiment, independent component analysis (ICA) can be used for transforming the combined data into the third set of signals. To this end, the third set of signals may be the main components of variation included in the first set of signals and the second set of signals.

For each of the at least one parameter of the training component, a corresponding relationship between the third set of signals and the reference values is determined, as shown in operation 212. This relationship may be determined by correlating the third set of signals (e.g. being the main components of variation included in the first set of signals and the second set of signals) and the reference values. For example, where the signals in the third set are the determined principal components, a correlation may be established between principal component amplitude and training component parameter.

Still yet, for each of the at least one parameter of the training component, a training model is created based on the corresponding determined relationship (see operation 214). Thus, the third set of signals can be used together with the known reference values for creating multiple training models that map the signals to each corresponding parameter. The training models could be linear models, neural networks, support vector machines (SVMs) or other machine learning models. It should be noted that operations 206-214 may similarly be repeated to create training models for each different metrology tool intended to be utilized for measuring the target component.

As described above, only certain parameters of the training component can be the subject of the present method 200, such that the training model can be created for any specific ones of the parameters of the training component or for all parameters of the training component, as desired. Furthermore, since it is an option that the third set of signals is a reduced set from the combined first/second sets of signals, as mentioned above, using this third set of signals to create the training model may result in a training model that focuses on the main components of variation (i.e. and is not necessarily a full parametric model of all possible parameters).

In operation 216, signals from a target component are collected, utilizing at least the first metrology tool and the second metrology tool. As noted above, additional metrology tools may also be utilized. Then in operation 218, each created training model is applied to the signals collected from the target component to measure parametric values for the target component. In this way, after the initial training is completed as described above in operations 206-214, then during an actual measurement, raw data is (i.e. the signals are) collected from the target component by the metrology tools and the previously trained transformation is applied to the raw data to measure the desired parametric values.

One benefit of the above method 200 is that a predefined model of the measurement technique for a particular metrology tool is not required (i.e. an accurate model computing measured signals based on the physics of interaction between the probe beam and the target); all the information is obtained simply from the variation of the raw data with an associated process condition (i.e. allowing for a "model-less" or "model-free" method). Accordingly, time to results is improved, as a model development for each metrology technique is not required.

Further, this method 200 can be applied for different metrology tools having a wide range of metrology techniques. One specific application of the method 200, by way of example, would be in characterization of silicon germanium composition and dimension in the source/drain regions of finFET devices. Typically these devices contain several regions of SiGe with different compositions and dimensions, and OCD struggles to accurately measure composition in at least one of the regions. Raw data from a high resolution XRD (HRXRD) or Raman tool could be used to generate a model-less measurement of SiGe composition, which could then be used in combination with OCD data to measure all the dimensional aspects of the device.

Figure 3:
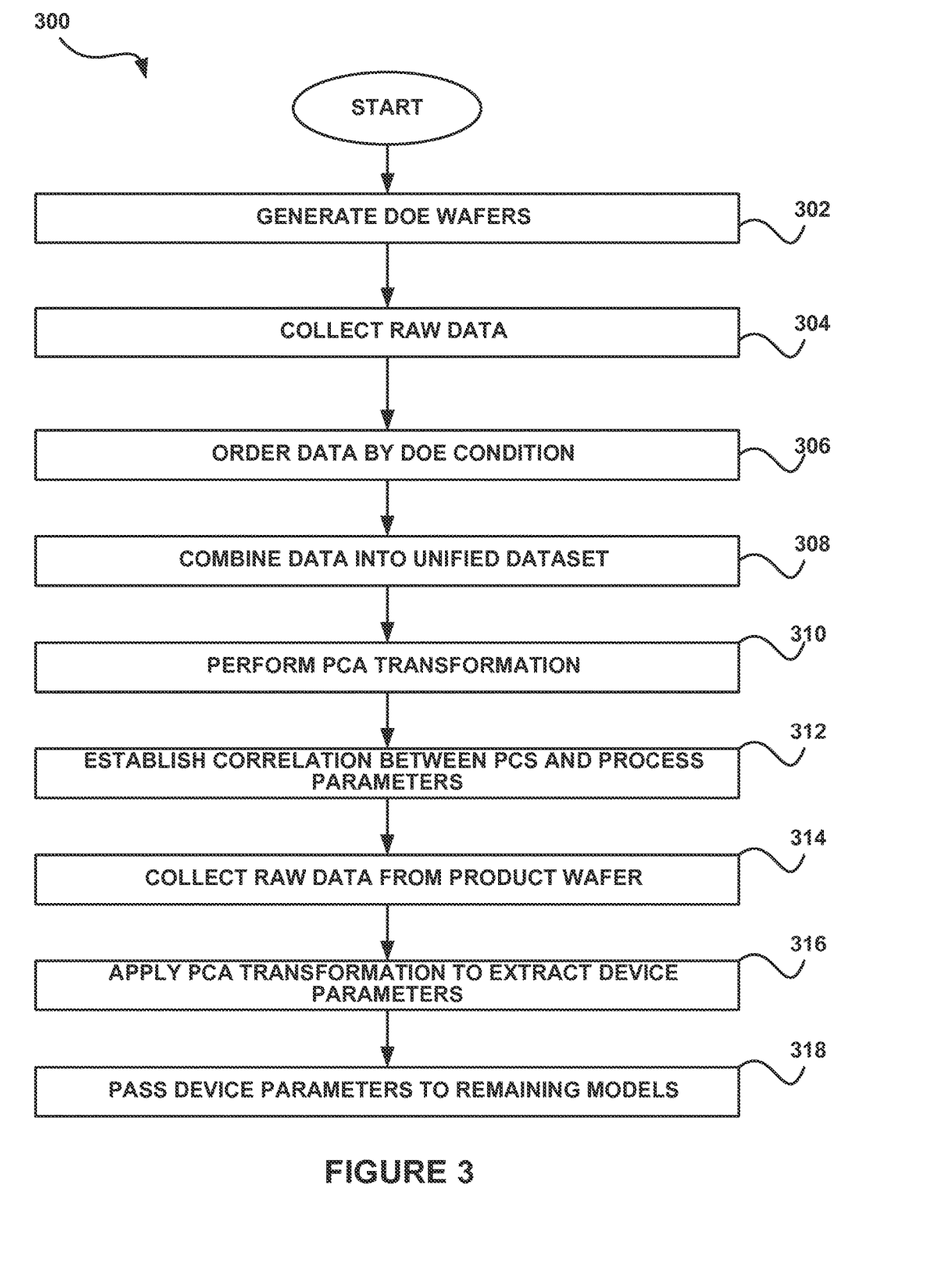
FIG. 3 illustrates a method for passing, to a model of metrology tool, device parameters measured from combining raw data from multiple metrology tools, in accordance with another embodiment.

FIG. 3 illustrates a method 300 for passing, to a model of metrology tool, device parameters measured from combining raw data from multiple metrology tools, in accordance with another embodiment. The method 300 may be implemented in the context of the previous figures. Accordingly, the aforementioned definitions and descriptions may equally apply to the present method 300.

As shown in operation 302, a set of DOE wafers are generated. Then in operation 304, raw data is collected. In particular, the set of DOE wafers are measured utilizing different metrology tools to collect raw data from each of the metrology tools. The raw data is ordered by DOE condition, as shown in operation 306. This ordering may result in an ordered (e.g. sorted) list of measurements for the DOE wafers. Further, the ordered raw data is combined into a unified dataset, as shown in operation 308.

PCA transformation is then performed on the unified dataset, as shown in operation 310. The PCA transformation is specifically performed to identify principle components within the unified dataset. Moreover, in operation 312 identified, a correlation between the identified principle components and process parameters of the DOE wafers is determined. This correlation is then utilized to form a training model.

In operation 314 raw data is collected from product (i.e. target) wafers utilizing the metrology tools. Then in operation 316, the previously trained transformation is then applied to the raw data to extract parameters of the product wafers (i.e. to measure the desired parametric values).

Further, in operation 318 the parametric values measured for the product wafers are sent to models of one or more other metrology tools for use in performing regression. For example, these models may be regressed in a well known manner using the measured parametric values. The parameters are determined by applying techniques described in U.S. patent application Ser. No. 14/223,045 filed Mar. 24, 2014 and U.S. patent application Ser. No. 14/252,323 filed Apr. 14, 2014.

In a specific embodiment of the method 300, any number of model-free measurements may be combined with any number of both model-free and/or model-based measurements. In another embodiment of the method 300, model-free measurements could be obtained on a separate target (measurement site) on the wafer, and the information passed to a set of model-free and/or model-based measurements being performed on a patterned device target (i.e. a "feed sideways" use case). In yet another embodiment of the method 300, model-free or model-based measurement results from a prior process step can be fed forward to a set of model-free and/or model-based measurements at the current process step (i.e. a "feed forward" use case). Thus, the method 300 is flexible in that model-free measurements can be combined with more complex model-based methods if necessary, so that the overall complexity of the measurement technique is improved, and accordingly raw data may be used from one metrology tool to characterize certain parameters of the device under test, while standard model-based methods may be used to determine the same or the remaining parameters using data another metrology tool.

Figure 4:
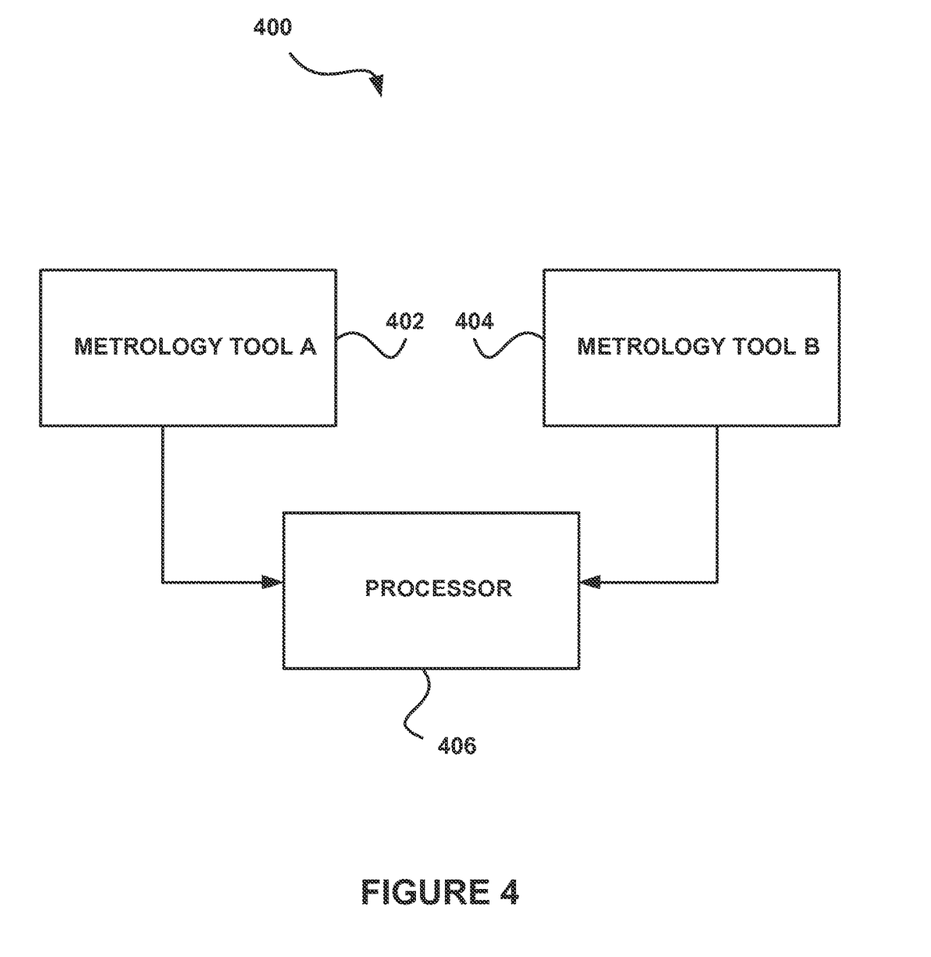
FIG. 4 illustrates a system for combining raw data from multiple meliology tools, in accordance with another embodiment.

FIG. 4 illustrates a system 400 for combining raw data from multiple metrology tools, in accordance with another embodiment. As shown, the system 400 includes a first metrology tool ("Metrology Tool A") 402 and a second metrology tool ("Metrology Tool B") 404. Metrology Tool A 402 and Metrology Tool B 404 may be located on a same hardware platform or different hardware platforms. Further, Metrology Tool A 402 and Metrology Tool B 404 may employ different metrology techniques.

Further, Metrology Tool A 402 and Metrology Tool B 404 are both in communication with a computer processor 406. The processor 406 may reside on the same hardware platform as one or both of Metrology Tool A 402 and Metrology Tool B 404, may reside on a different hardware platform as one or both of Metrology Tool A 402 and Metrology Tool B 404, or may be a component of one of Metrology Tool A 402 and Metrology Tool B 404.

System 400 operates such that reference values for at least one parameter of a training component are stored in memory (not shown). Metrology Tool A 402 collects a first set of signals for the at least one parameter of the training component and Metrology Tool B 404 collects a second set of signals for the at least one parameter of the training component.

The processor 406 transforms at least a portion of each of: the first set of signals and the second set of signals into a third set of signals, and for each parameter of the training component determines a corresponding relationship between the third set of signals and the reference values. Further, for each parameter of the training component, the processor 406 creates a training model based on the corresponding determined relationship. Signals collected from a target component by Metrology Tool A 402 and the Metrology Tool B 404 are identified by the processor 406, and each created training model is applied to the signals collected from the target component to measure parametric values for the target component.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a computer system, a training wafer fabricated through a first semiconductor fabrication process;
   obtaining, by the computer system, predefined reference values for at least one parameter of the training wafer;
   collecting, from the training wafer by the computer system, a first set of signals for the at least one parameter of the training wafer, utilizing a first metrology tool comprised of a first hardware configuration, the collecting the first set of signals utilizing the first metrology tool performed by:
      a light source of the first metrology tool directing light towards one or more areas of the training wafer, and
      a detector of the first metrology tool receiving light reflected from the one or more areas of the training wafer, generating the first set of signals responsive to the received light, and outputting the first set of signals to the computer system;
   collecting, from the training wafer by the computer system, a second set of signals for the at least one parameter of the training wafer, utilizing a second metrology tool that is different from the first metrology tool by being comprised of a second hardware configuration that is different from the first hardware configuration, the collecting the second set of signals utilizing the second metrology tool performed by:
      a light source of the second metrology tool directing light towards the one or more areas of the training wafer, and
      a detector of the second metrology tool receiving light reflected from the one or more areas of the training wafer, generating the second set of signals responsive to the received light, and outputting the second set of signals to the computer system;
   transforming, by the computer system, at least a portion of each of: the first set of signals and the second set of signals into a third set of signals;
   for each of the at least one parameter of the training wafer, determining, by the computer system, a corresponding relationship between the third set of signals and the reference values;
   for each of the at least one parameter of the training wafer, creating, by the computer system, a training model based on the corresponding determined relationship;
   collecting, by the computer system, signals from a target wafer fabricated through the first semiconductor fabrication process or a second semiconductor process, utilizing at least the first metrology tool and the second metrology tool,
   the collecting the signals utilizing the first metrology tool performed by:
      the light source of the first metrology tool directing light towards one or more areas of the target wafer, and
      the detector of the first metrology tool receiving light reflected from the one or more areas of the target wafer, generating a first portion of the signals responsive to the received light, and outputting the first portion of the signals to the computer system, and
   the collecting the signals utilizing the second metrology tool performed by:
      the light source of the second metrology tool directing light towards the one or more areas of the target wafer, and
      the detector of the second metrology tool receiving light reflected from the one or more areas of the target wafer, generating a second portion of the signals responsive to the received light, and outputting the second portion of the signals to the computer system;
   measuring parametric values for dimensional aspects of the target wafer by applying, by the computer system, each created training model to the signals collected from the target wafer.

2. The method of claim 1, wherein the target wafer is the same as the training wafer.

3. The method of claim 1, wherein the training wafer is a design of experiment wafer that is different from the target wafer.

4. The method of claim 1, wherein the at least one parameter of the training wafer includes at least one of a geometric parameter, a material composition parameter, a process parameter or an overlay parameter.

5. The method of claim 4, wherein the at least one parameter of the training wafer includes the process parameter, and wherein the process parameter is one of a focus parameter and a dose parameter.

6. The method of claim 4, wherein the at least one parameter of the training wafer includes the geometric parameter, and wherein the geometric parameter is one of a critical dimension, a sidewall angle, and a profile height.

7. The method of claim 1, wherein the reference values are obtained utilizing at least one of critical dimension scanning electron microscopy (CD-SEM), transmission electron microscopy (TEM), and atomic force microscopy (AFM).

8. The method of claim 1, wherein the first metrology tool and the second metrology tool are each a different one of:
   Spectroscopic ellipsometer (SE);
   SE with multiple angles of illumination;
   SE measuring Mueller matrix elements;
   Single-wavelength ellipsometers;
   Beam profile ellipsometer;
   Beam profile reflectometer;
   Broadband reflective spectrometer;
   Single-wavelength reflectometer;
   Angle-resolved reflectometer;
   Imaging system;
   Scatterometer;
   Small-angle X-ray scattering (SAXS) device;
   X-ray powder diffraction (XRD) device;
   X-ray Fluorescence (XRF) device;
   X-ray photoelectron spectroscopy (XPS) device;
   X-ray reflectivity (XRR) device;
   Raman spectroscopy device;
   scanning electron microscopy (SEM) device;
   TEM device; and
   AFM device.

9. The method of claim 1, wherein the at least a portion of each of: the first set of signals and the second set of signals are transformed into the third set of signals utilizing at least one preprocessing operation, the at least one preprocessing operation including at least one of alignment, filtering, and aberration corrections.

10. The method of claim 1, wherein the at least a portion of each of: the first set of signals and the second set of signals are transformed into the third set of signals by principal component analysis (PCA) or independent component analysis (ICA).

11. The method of claim 1, wherein the third set of signals are the main components of variation included in the first set of signals and the second set of signals.

12. The method of claim 11, wherein the relationship between the third set of signals and the reference values corresponding to each of the at least one parameter of the training component is determined by correlating amplitude of each signal in the third set of signals with a corresponding reference value in the reference values.

13. The method of claim 1, wherein the training model is one of a linear model, a neural network, and support vector machine (SVM).

14. The method of claim 1, further comprising sending the parametric values measured for the target component to a model of at least one of the first metrology tool and the second metrology tool for use in performing regression.

15. The method of claim 1, wherein the measured parametric values are used to feed corrections to the one of the first semiconductor fabrication process or the second semiconductor fabrication process used to fabricate the target wafer.

16. A computer program product embodied on a non-transitory computer readable medium, the computer program product including code adapted to be executed by a computer system to perform a method comprising:
  identifying, by the computer system, a training wafer fabricated through a first semiconductor fabrication process;
  obtaining, by the computer system, predefined reference values for at least one parameter of the training wafer;
  collecting, from the training wafer by the computer system, a first set of signals for the at least one parameter of the training wafer, utilizing a first metrology tool comprised of a first hardware configuration, the collecting the first set of signals utilizing the first metrology tool performed by:
    a light source of the first metrology tool directing light towards one or more areas of the training wafer, and
    a detector of the first metrology tool receiving light reflected from the one or more areas of the training wafer, generating the first set of signals responsive to the received light, and outputting the first set of signals to the computer system;
  collecting, from the training wafer by the computer system, a second set of signals for the at least one parameter of the training wafer, utilizing a second metrology tool that is different from the first metrology tool by being comprised of a second hardware configuration that is different from the first hardware configuration, the collecting the second set of signals utilizing the second metrology tool performed by:
    a light source of the second metrology tool directing light towards the one or more areas of the training wafer, and
    a detector of the second metrology tool receiving light reflected from the one or more areas of the training wafer, generating the second set of signals responsive to the received light, and outputting the second set of signals to the computer system;
  transforming, by the computer system, at least a portion of each of: the first set of signals and the second set of signals into a third set of signals;
  for each of the at least one parameter of the training wafer, determining, by the computer system, a corresponding relationship between the third set of signals and the reference values;
  for each of the at least one parameter of the training wafer, creating, by the computer system, a training model based on the corresponding determined relationship;
  collecting, by the computer system, signals from a target wafer fabricated through the first semiconductor fabrication process or a second semiconductor process, utilizing at least the first metrology tool and the second metrology tool,
  the collecting the signals utilizing the first metrology tool performed by:
    the light source of the first metrology tool directing light towards one or more areas of the target wafer, and
    the detector of the first metrology tool receiving light reflected from the one or more areas of the target wafer, generating a first portion of the signals responsive to the received light, and outputting the first portion of the signals to the computer system, and
  the collecting the signals utilizing the second metrology tool performed by:
    the light source of the second metrology tool directing light towards the one or more areas of the target wafer, and
    the detector of the second metrology tool receiving light reflected from the one or more areas of the target wafer, generating a second portion of the signals responsive to the received light, and outputting the second portion of the signals to the computer system;
  measuring parametric values for dimensional aspects of the target wafer by applying, by the computer system, each created training model to the signals collected from the target wafer.

17. A system, comprising:
  a computer processor;
  a memory storing predefined reference values for at least one parameter of a training wafer fabricated through a first semiconductor fabrication process;
  a first metrology tool comprised of a first hardware configuration, the first metrology tool:
    collecting, from the training wafer, a first set of signals for the at least one parameter of the training wafer, the collecting the first set of signals performed by:
      a light source of the first metrology tool directing light towards one or more areas of the training wafer, and
      a detector of the first metrology tool receiving light reflected from the one or more areas of the training wafer, generating the first set of signals responsive to the received light, and outputting the first set of signals to the computer processor, and
    collecting, from a target wafer fabricated through the first semiconductor fabrication process or a second semiconductor process, a first portion of signals, the collecting the first portion of signals performed by:
      the light source of the first metrology tool directing light towards one or more areas of the target wafer, and the detector of the first metrology tool receiving light reflected from the one or more areas of the target wafer, generating the first portion of signals responsive to the received light, and outputting the first portion of signals to the computer processor;

a second metrology tool being different from the first metrology tool by being comprised of a second hardware configuration that is different from the first hardware configuration, the second metrology tool:

collecting, from the training wafer, a second set of signals for the at least one parameter of the training wafer, the collecting the second set of signals performed by:

a light source of the second metrology tool directing light towards the one or more areas of the training wafer, and a detector of the second metrology tool receiving light reflected from the one or more areas of the training wafer, generating the second set of signals responsive to the received light, and outputting the second set of signals to the computer processor, and collecting, from the target wafer, a second portion of signals, the collecting the second portion of signals performed by:

the light source of the second metrology tool directing light towards the one or more areas of the target wafer, and the detector of the second metrology tool receiving light reflected from the one or more areas of the target wafer, generating the second portion of signals responsive to the received light, and outputting the second portion of signals to the computer processor;

the computer processor for:

receiving, from the first metrology tool, the first set of signals collected from the training wafer, receiving, from the second metrology tool, the second set of signals collected from the training wafer, receiving, from the first metrology tool, the first portion of signals collected from the target wafer, receiving, from the second metrology tool, the second portion of signals collected from the target wafer, transforming at least a portion of each of: the first set of signals and the second set of signals into a third set of signals, for each of the at least one parameter of the training wafer, determining a corresponding relationship between the third set of signals and the reference values, for each of the at least one parameter of the training wafer, creating a training model based on the corresponding determined relationship, and measuring parametric values for dimensional aspects of the target wafer by applying each created training model to the first portion of signals and the second portion of signals collected from the target wafer.

18. The system of claim 17, wherein the first metrology tool and the second metrology tool reside on a same hardware platform.

19. The system of claim 18, wherein the computer processor resides on the same hardware platform as the first metrology tool and the second metrology tool.

20. The system of claim 17, wherein the first metrology tool and the second metrology tool reside on different hardware platforms.

21. The system of claim 20, wherein the computer processor resides on the same hardware platform the first metrology tool or the second metrology tool.

* * * * *